United States Patent [19]

Cipriano

[11] Patent Number: 5,148,649
[45] Date of Patent: Sep. 22, 1992

[54] FRAMING AND IN PARTICULAR, IN FRAMES OR CASINGS OF WOOD

[76] Inventor: Rocco Cipriano, Via Acqua Del Paradiso No 8, Avellino C.F. CPRRCC46E04d798D, Italy

[21] Appl. No.: 583,064

[22] Filed: Sep. 14, 1990

[51] Int. Cl.⁵ ................................................. E04C 2/38
[52] U.S. Cl. ......................................... 52/656; 49/504; 403/402; 403/403
[58] Field of Search ............................ 52/656; 49/504; 403/402, 403

[56] References Cited

U.S. PATENT DOCUMENTS

| | | | |
|---|---|---|---|
| 4,610,565 | 9/1986 | Nakayama | 403/402 |
| 4,566,234 | 1/1986 | Held | 52/656 X |
| 2,883,711 | 4/1969 | Kump | 52/656 X |
| 4,205,470 | 6/1980 | Kapnek | 56/656 X |
| 4,205,486 | 6/1980 | Guarnacci | 59/504 |
| 4,341,831 | 7/1982 | Kleiss | 53/656 X |
| 4,676,026 | 6/1987 | Schreiner | 49/504 |
| 4,982,547 | 1/1991 | Stolle et al. | 52/656 |

FOREIGN PATENT DOCUMENTS

| | | | |
|---|---|---|---|
| 2912020 | 9/1980 | Fed. Rep. of Germany | 49/504 |
| 2307114 | 4/1976 | France | 49/504 |
| 255510 | 2/1988 | World Int. Prop. O. | 49/504 |

Primary Examiner—Henry E. Raduazo

[57] ABSTRACT

A deep groove or slot is provided at the joint between each stile and each rail to permit the accomodation, within the thickness of the element, of an appropriately shaped stiffener of suitable material such as stainless steel, aluminum alloy, galvanized sheet, brass, etc. In addition, both the stiles and the rails of each of the two elements of the window are provided on one of their surfaces with two deep grooves designed to accept suitable seals, while their outer surface is provided with steps, which match corresponding steps on the opposing element. The stiffener has an L-, C-, or Z-shaped cross section and forms essentially a right angle. After the stiffeners have been inserted in the stiles and the associated rails they thus disappear from view.

The rails and the stiles can be of laminated construction, and after the individual layers have been bonded, they form either the grooves which house the stiffeners or the grooves which house the seals.

5 Claims, 1 Drawing Sheet

FRAMING AND IN PARTICULAR, IN FRAMES OR CASINGS OF WOOD

BACKGROUND OF THE INVENTION

It is known that wood has always been used to make framing or windows for both interior and exterior use. At present, with the development of the chemical industry, framing of light metal (anodized aluminum), plastic, PVC, etc. has become widespread.

All these new types of framing, however, suffer from a lack of design flexibility, i.e., they are suitable only for relatively large production runs. Designers, however, frequently used different framing dimensions to satisfy various requirements, both practical and esthetic.

Some of the principal disadvantages of wood are its tendency to warp and twist under the effects of weather and the variable loads applied to it and the fact that the joints between stiles and rails tend to loosen due to the action of atmospheric effects and the weight of the panels, of glass and/or wood, supported by the frame itself. It is also frequently difficult to install a large number of glass panes in a wood frame due to their excessive weight; hence, the joints must be particularly sturdy.

It should also be noted that builders frequently resort to external reinforcement of the joints, e.g., reinforcement with square iron elements, which are not only unattractive but are also subject to attack by atmospheric agents.

The goal of the present invention is to improve windows or frames of wood. These improvements make it possible to produce framing of any dimension or shape out of modular elements that can be easily and permanently interconnected. Because of their ease of assembly and dimensional adaptability, they can be shipped disassembled in boxes, resulting in substantial savings in transport and storage costs.

BRIEF DESCRIPTION OF THE INVENTION

A deep groove or slot is provided at the joint between each stile and each rail to permit the accommodation, within the thickness of the element, of an appropriately shaped stiffener of suitable material such as stainless steel, aluminum alloy, galvanized sheet, brass, etc. In addition, both the stiles the rails of each of the two elements of the window are provided on one of their surfaces with two deep grooves designed to accept suitable seals, while their outer surface is provided with steps, which match corresponding steps on the opposing element. The stiffener has an L-, C-, or Z-shaped cross section and forms essentially a right angle. After the stiffeners have been inserted in the stiles and the associated rails they thus disappear from view.

The rails and the stiles can be of laminated construction, and after the individual layers have been bonded, they form either the grooves which house the stiffeners or the grooves which house the seals.

Accordingly to the invention, the window elements, both the panel and the outside frame, have deep grooves or slots at the joints between the stiles and rails which form when the window is assembled. These grooves permit accommodation, within the thickness of the element, of a suitably shaped stiffener of material that is preferably resistant to atmospheric agents.

Again according to the invention, both the stiles and the rails of each of the two elements of the window, i.e., the panel and the jamb, are provided on both surfaces with grooves to accept suitable seals, the outer surface of each of said elements being step-shaped, preferably with 3 steps, that have their counterpart in corresponding steps of the opposing element, jamb and panel.

On the opposing faces of two elements of the same part, panel or jamb, i.e., between the rail and stile, in the faces that constitute the joint, shallow grooves are also provided to accept a seal, which prevents the entrance or escape of the moisture that could form in or penetrate the window, without allowing it to stagnate and preventing it from penetrating further inside.

DESCRIPTION OF THE DRAWINGS

The improvements to the windows can be understood more easily from the following description of a preferred embodiment with reference to the attached drawings.

DETAILED DESCRIPTION OF THE INVENTION

Figure 1:
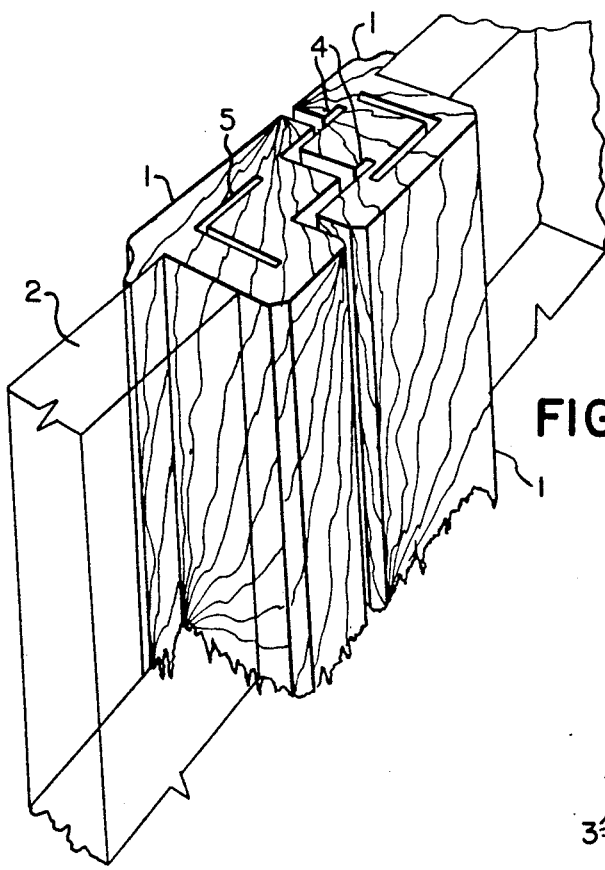
FIG. 1 shows the cross section the profile of two opposing panels in a dual frame.
Figure 2:
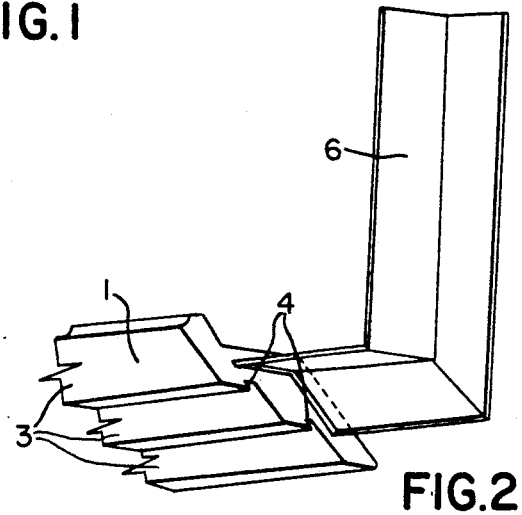
FIG. 2 shows a perspective view of an element (stile and rail) of the outside frame with the associated metal reinforcement.
Figure 4:
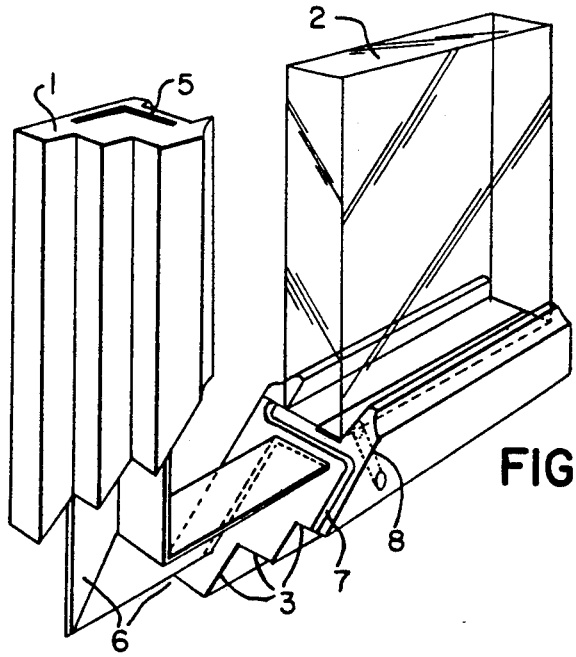
FIG. 4 shows a complete glass window in the assembly phase.
Figure 3:
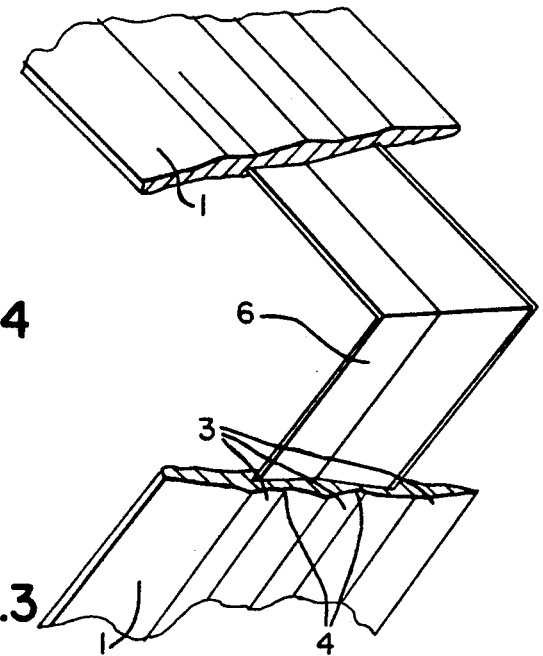
FIG. 3 shows a perspective view of two frame elements in the assembly phase.

According to the invention, each of the basic parts of a window, both the panel and the jamb, consists of elements 1, that are joined to form a complete frame. An important characteristic of the section to be produced is that it have on the outer side, opposite that on which panel 2, either of glass or other material, is to be lodged, a surface with steps 3, preferably three, separated by relatively deep grooves 4 to accept a suitable seal (not shown). Stepped surfaces 3 match the stepped surface of the element opposite it, thus achieving an excellent seal against the infiltration of atmospheric agents.

As previously indicated, each part of the window is formed of identical profiled elements, which are connected at an angle to form the rails and stiles of the window, whether of the panel or of the jamb.

A characteristic of the invention is the way in which the elements are connected. In particular, the stiles and the rails to be joined together are provided in their thickness with a deep groove 5, appropriately shaped and capable of accepting a correspondingly profiled metal element 6. In the figures, groove 6 is shown with an L-shaped cross section, but it obviously could assume a different form such as a C, Z, or other.

Overall, profile 6, which has a section corresponding to groove or recess 5 and which in its longitudinal extent is bent at a suitable angle, either obtuse or right or even acute, is sufficiently rigid to prevent wood elements 1 which receive and form the frame from changing the angle imparted to them by the presence of metal elements 6 inside them, which do not at the same time prevent their reciprocal torsion. An extremely sturdy construction of the panel and the jamb is obtained in this manner, a construction that makes it possible (1) to support the weight of a glass surface 2 with several panes, including antifogging panes; and (2) to use very heavy panels.

A central joint of a panel with two rabbets is shown in FIG. 1.

Given the construction of the framework as described above, it is sufficient to glue the rails to the stiles well, together with a suitable fastener such as an oblique screw between these two elements, to render each joint rigid and impervious to moisture.

To prevent moisture from infiltrating between the assembled surfaces, a groove 7 is provided on at least one of these surfaces, which leads from the inside of the element to the outside and which is designed essentially to receive a seal or packing to prevent moisture from infiltrating into the joints. Analogously, in the part of the rail of the jamb located above the threshold of the window space, a channel 8 is provided, which is designed to conduct to the outside any condensate or rain water that runs down from the rabbet and would collect on the rail itself.

Of course, a shutter or the like, built under the same criteria as the panels of the invention or with the usual criteria for the construction of panels of wood, could also be installed on the window.

It should be noted that, because of the ease with which the window can be assembled, it can be shipped unassembled in a box, the framing being readily adaptable to dimensions less than those furnished. This makes the use of wooden frames according to the invention much more economical than those of other materials.

It is also possible to use the connecting method of the invention to produce frames that have designs other than rectangular or square. In fact, shaped stiles and/or rails can be provided with an inside arch, for example, metal cores 6 in this case having an angle suitable for the curve of the arch to be produced.

A constructive expedient is that of producing the frame or window by the lamination method. In this case, each element forming the rail or the stile of the frame in general, whether the panel or the jamb, can be formed of stacked and/or opposing layers of wood. With such an implementation, it is extremely simple and economical to produce groove 5, no special equipment being required.

In addition to the advantages of modularity, high mechanical strength, and dimensional stability, the window described offers in particular excellent thermal and acoustic insulation when a triple rabbet is used, with the associated benefits of relative sealing and the possibility of adopting double and/or chamber panes. Furthermore, by extending and appropriately shaping stiffeners 6, it is possible according to the invention to provide metal edging completely around the framing, whether jamb or panel.

The frame according to the invention has been described and illustrated on the basis of a nonlimiting example. Modifications of a structural order that will be suggested by technology and practical execution could obviously be effected without departing from the scope of the invention, which is apparent from the following claims.

Without further elaboration, the foregoing will so fully illustrate my invention that others may, by applying current or future knowledge, adopt the same for use under various conditions of service.

What I claim as the invention is:

1. Improvements to wood frames including at least one stile and at least one rail which when assembled and contacting each other at an end thereof in a mating joint as defined by a mating end surface of said stile and a mating end surface of said rail, characterized in that a first narrow slot having two legs and at least two inclined sections is provided in each of said mating surfaces, said first slot extending within said rail and within said stile for a substantial distance, said rail and stile being capable of being assembled to form a portion of a window, each of said first slots permitting the accommodation of a metallic, relatively planar stiffener of substantial length having at least two legs, with each stiffener leg being located in said first slot and being of the same general shape as said first slot and wherein said stiffener is not visible when said stile and rail are assembled, said stiffener being positioned essentially wholly within said first slot and wherein the substantial length of said stiffener enables the attachment of hardware remote from said mating joint, said stiffeners being of a material that is not attacked by atmospheric agents, and screw means contacting a stiffener leg to hold said mating joint rigid.

2. The invention of claim 1 wherein said joint between said stile and said rail additionally comprises at least one face having at least one second slot provided on said at least one face, and wherein said second slot is capable of receiving a seal and/or a gasket therein for preventing outside moisture from penetrating into said joint.

3. The invention of claim 1 wherein said stiffener forms essentially a right angle so as to connect said stile to said rail.

4. The invention of claim 3 wherein said stiffener has a L-, C-, or Z- shaped cross section.

5. The invention of claim 1 wherein said rail and said stile are comprised of a plurality of layers which are secured together to form a laminate construction having said first and second slots.

* * * * *